United States Patent [19]

Buechner et al.

[11] 4,093,795

[45] June 6, 1978

[54] MULTI-STAGE ISOLATION OF HIGH PRESSURE POLYETHYLENE

[75] Inventors: Oskar Buechner, Dudenhofen; Gottfried Schlichthaerle, Neustadt; Friedrich Urban, Limburgerhof, all of Germany

[73] Assignee: BASF Aktiengesellschaft, Germany

[21] Appl. No.: 687,870

[22] Filed: May 19, 1976

[51] Int. Cl.² ............................ C08F 6/26; C08F 6/28
[52] U.S. Cl. ................................. 528/481; 260/676 R; 526/64; 526/352; 528/501; 528/503
[58] Field of Search ..................... 528/481, 501, 503; 260/676 R

[56] References Cited

U.S. PATENT DOCUMENTS

| 2,646,425 | 7/1953 | Barry | 260/94.9 |
|---|---|---|---|
| 3,132,120 | 5/1964 | Graham et al. | 260/78.5 |
| 3,201,365 | 8/1965 | Charlesworth et al. | 260/34.2 |
| 3,336,281 | 8/1967 | Eilbracht et al. | 260/94.9 |
| 3,412,080 | 11/1968 | Smith et al. | 260/94.9 |
| 3,736,305 | 5/1973 | Kinkel et al. | 260/80.78 |

*Primary Examiner*—Stanford M. Levin
*Attorney, Agent, or Firm*—Keil, Thompson & Shurtleff

[57] ABSTRACT

A process for the manufacture of ethylene polymers by high pressure polymerization of ethylene, if desired mixed with other compounds copolymerizable with ethylene, and isolation of the reaction product in a multi-stage isolation zone. The molecular weight of the ethylene polymer can be varied by varying the temperature prevailing in the isolation zone. The isolation zone preferably consists of two stages, with a higher pressure prevailing in the first stage than in the second stage.

6 Claims, 1 Drawing Figure

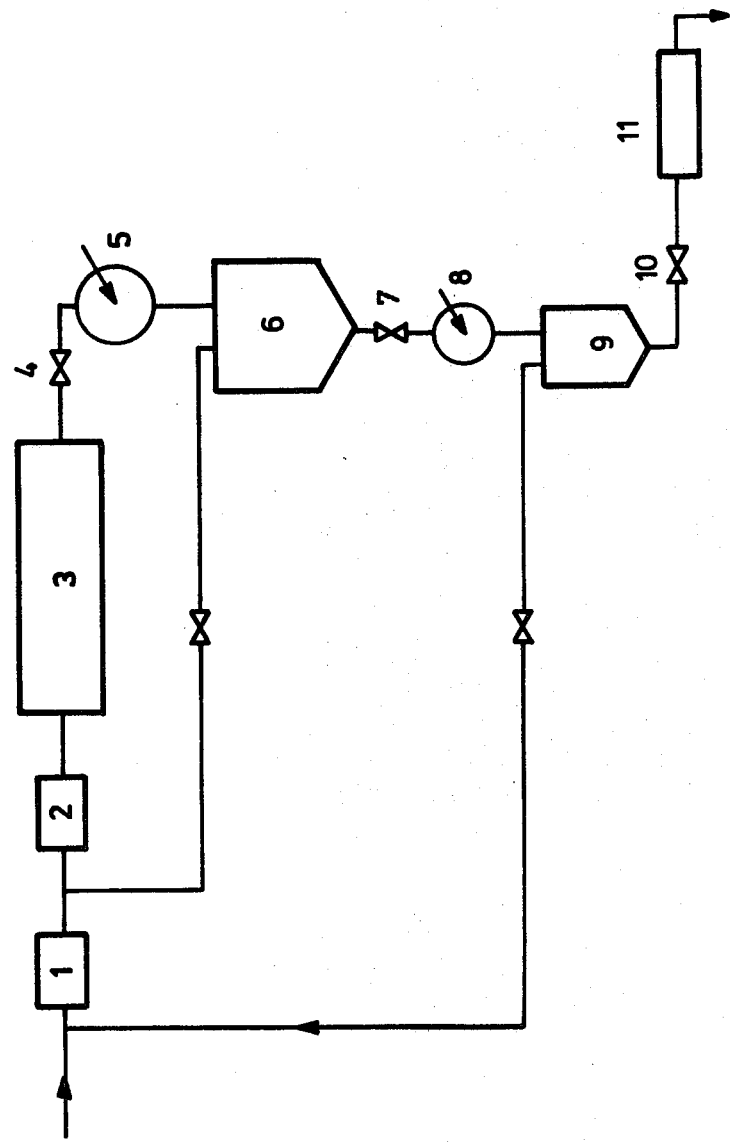

MULTI-STAGE ISOLATION OF HIGH PRESSURE POLYETHYLENE

The present invention relates to a process for the manufacture of ethylene polymers by high pressure polymerization of ethylene, if appropriate, mixed with other compounds copolymerizable therewith.

Oily, waxy or solid ethylene polymers can be manufactured by polymerizing ethylene at elevated pressures, if desired together with other compounds which are copolymerizable with ethylene, in the presence of catalysts which form free radicals. The polymerization is in most cases carried out continuously in tubular reactors or stirred autoclaves, the polymers being separated from the volatile components in separators after leaving the reactor. In most cases, this is carried out by means of a high pressure separator, in which the pressure is from 100 to 500 bars, followed by a low pressure separator, which is run at pressures of from 1 to 10 bars.

The properties of the polymers obtained by high pressure polymerization of ethylene may be varied by varying the polymerization conditions. In continuous reactors, when changing over from one type of product to another, the polymerization conditions are one type of product to another, the polymerization conditions are adapted to the desired type of product. However, this method is expensive and involved and has the further disadvantage that during the relatively long time required to adapt the reaction conditions in the reactor, polymers are obtained which are off-spec.

It is an object of the present invention to provide a process for the manufacture of ethylene polymers by homopolymerization of ethylene or copolymerization of ethylene with other compounds which are copolymerizable with ethylene, in a polymerization zone at pressures of from 500 to 5,000 bars and at from 50° to 450°C, followed by isolation of the resulting polymer from the reaction mixture in an isolation zone, which does not suffer from the disadvantages of the conventional processes.

We have found that this object is achieved by a process in which the temperature in the isolation zone is varied during the continuous process within the range of 100° to 400° C, the temperature being raised to decrease the molecular weight and lowered to increase the molecular weight.

It is an advantage of the process of the invention that the properties of the polymer can be varied merely by varying the temperature in the isolation zone, without altering the conditions in the polymerization zone. A variation in the temperature in the isolation zone can be achieved relatively simply, without great technical effort and within a short time, so that only relatively small amounts of an off-spec polymer are obtained during the changeover time. Furthermore, unintentional changes in the properties of the end product, resulting from a disturbance of the polymerization conditions in the polymerization zone, can be counteracted by appropriately adapting the temperature in the isolation zone.

The process according to the invention is applicable to the homopolymerization of ethylene and to the copolymerization of ethylene with other compounds copolymerizable with ethylene. These compounds may be any monomers which can conventionally be copolymerized with ethylene under high pressure conditions in the presence of catalysts which form free radicals. Examples of such compounds are acrylic acid and its esters, acrylonitrile, acrylamide, vinyl acetate, vinyl propionate and vinyl ethers.

The polymerization of ethylene, if appropriate together with other compounds, is carried out at pressures of from 500 to 5,000 bars, preferably from 1,000 to 3,500 bars. The temperatures in the polymerization zone are from 50° to 450° C, preferably from 200° to 360° C. The conditions in the polymerization zone can advantageously be realized in tubular reactors and/or autoclave reactors. Tubular reactors are polymerization vessels of which the length is from 10,000 to 40,000 times the diameter of the circular cross-section of the tube. If autoclave reactors are used, in which the inner space in most cases has a ratio of height to diameter of the circular cross-section of from 1 : 1 to 20 : 1, the reaction mixture is agitated by means of stirrers. Details of processes in which tubular reactors and autoclave reactors are used are to be found, e.g., in Ullmanns Enzyklopadie der Techn. Chemie, 3rd edition, volume 14, pages 137 – 148.

In the process of the invention, the pressure in the isolation zone should be from 1 to 500 bars. The process is advantageously carried out in two stages, the reaction mixture being let down to a pressure of from 100 to 500 bars in the first stage and to from 1 to 10 bars in the second stage. In this isolation zone, the polymer formed is separated from the unconverted volatile components, which are purified, condensed and recylced to the reaction.

According to the invention, relatively low temperatures should be used to achieve a high molecular weight and relatively high temperatures to achieve a low molecular weight. The temperatures in each stage of the isolation zone vary from 100° to 400° C.

The temperature must be suitably chosen for pressures and mean product residence times in the particular stage of the isolation zone, and for the desired type of product.

The pressures in the various stages of the isolation zone can be chosen within the range indicated above.

The mean product residence times in the various stages of the isolation zone may be varied from 0.5 to 60 minutes. However, the variation of the mean product residence times is not an object of the present invention.

The mean product residence time is the mean time for which the polymer remains in the isolation zone. It is defined as the ratio of the amount of polymer present in the isolation zone to the polymer throughput in the isolation zone per unit time. If the isolation is effected in several stages, it is advantageous to specify a separate mean residence time for each stage.

At times it is advantageous to vary the temperature (in order to obtain the desired molecular weight) in the first stage of the isolation zone but to keep it constant in the second stage and in further stages, if any. However, it is also possible to employ the converse procedure and keep the temperature constant in the first stage and vary it in the second stage. Furthermore, it is possible to combine both measures and vary the temperature in the first stage and in the other stages or second stage. It is particularly advantageous to vary the temperatures in the same sense in all stages of the isolation zone.

An indication of the magnitude of the molecular weight is provided by the melt index, commonly abbreviated MFI (melt flow index), and determined according to DIN 53,735. A low melt index indicates a high molecular weight and a high melt index indicates a low molecular weight.

We have found that using the process of the invention it is possible to vary not only the molecular weights but also other product properties by varying the temperature in the isolation zone. Thus, e.g., an increase in temperature in general produces an improvement in the scatter.

The scatter may be determined by means of an apparatus described by E. Schuch in "Kunststoffe", 56 (1966), 350 – 354. Furthermore, all other properties which are essentially affected by the molecular weight of the polymer may be varied by varying the temperatures.

In the isolation zone, the polymer formed in the reactor is separated from the volatile components.

The working conditions in the isolation zone can be realized by means of apparatuses which, in the case of a two-stage isolation apparatus, are described as high pressure separator and low pressure separator. The conventional vessels may be used as the high pressure separator and low pressure separator.

The process according to the invention will now be described for the example of a two-stage isolation zone, with the aid of the appended FIG. 1.

The reaction gas (ethylene or a mixture of ethylene and compounds copolymerizable with ethylene) is compressed to the reaction pressure in a pre-compressor 1 and a post-compressor 2 and is fed into the reactor 3 (the polymerization zone), which may be stirred reactor and/or a tubular reactor. The polymer formed, and the unconverted compounds, pass from there through a valve 4, in which the reaction mixture is let down from the reaction pressure to the pressure at which it is to be isolated, into the cooling or heating apparatus 5 and from there into the high pressure separator 6 (isolation zone, 1st stage). The volatile phase of the reaction mixture, separated off in the high pressure separator, is fed to the intake side of the post-compressor 2 in order to be re-compressed. The solution, in which the polymer content has thus been increased, passes through the valve 7 and enters the low pressure separator 9 (isolation zone, 2nd stage) via the cooling or heating apparatus 8. The volatile components isolated in the low pressure separator are returned to the intake side of the pre-compressor 1. The polymer passes through the valve 10 and is subsequently processed by conventional methods in the polymer-discharge apparatus 11 (an extruder). The cooling and heating apparatuses 5 and 8 serve to bring the reaction mixture to the temperature which it is intended to have in the high pressure separator and low pressure separator (of the isolation zone). The cooling and heating of the reaction mixture can be effected by conventional methods, either by direct or by indirect heat exchange.

In the case of direct heat exchange, the temperature of the polymer in the high pressure separator and/or low pressure separator is adjusted or regulated by injecting varying amounts of, e.g., monomers, water etc.

In the case of indirect heat exchange, the temperature in the high pressure separator and low pressure separator may be adjusted by means of heat exchange surfaces of varying sizes, or by varying the temperature of the cooling media or heating media, or by varying the amount of these media. In the case of the cooling apparatus and heating apparatus between the high pressure separator and low pressure separator, a static mixer has proved of value for improving the heat transfer conditions on the polymer side. By using the above measures, the temperatures in the high pressure separator and low pressure separator are adjusted to values of from 100° to 400° C.

The mean product residence times in the high pressure separator and low pressure separator may be varied, if the amount of polymer produced per unit time is constant, by varying the amounts of polymer present in the separators, i.e. by varying the level of the product in the separators. The level in the high pressure separator is controlled by means of the valve 7. The level in the low pressure separator may be varied by means of the valve 10 or by means of the speed of the polymer discharge apparatus 11.

If the mean temperature in the high pressure separator and low pressure separator are varied simultaneously, it is advantageous to raise or lower them in the same sense, i.e. raise or lower all the residence times.

EXAMPLE 1

About 1,700 kg/hour of a homopolymer are produced in a high pressure tubular reactor. The conditions in the reactor are set so that, using a temperature of 200° C in the high pressure separator and a mean residence time, in the same separator, of about 3 minutes, the end product has a melt index of 0.2 g/10 mins and a density of 0.918 g/cm$^3$ (Table 1, Setting I).

On raising the temperature in the high pressure separator from 200° C to 300° C and in the low pressure separator from 180° C to 260° C, whilst keeping the conditions in the reactor the same and retaining a constant mean product residence time in the high pressure separator and low pressure separator, the melt index of the end product rises from 0.2 to 1.5 g/10 mins (compare Table 1, Setting II).

TABLE 1

| Conditions | Setting I | Setting II |
|---|---|---|
| High pressure separator | | |
| Temperature (° C) | 200 | 300 |
| pressure (bars) | 320 | 320 |
| mean product residence time (mins) | 3 | 3 |
| LDPE produced (kg/hr) | 1,700 | 1,700 |
| Low pressure separator | | |
| Temperature (° C) | 180 | 260 |
| pressure (bars) | 5 | 4 |
| mean product residence time (mins) | 15 | 15 |
| Product properties | | |
| Density (g/cm$^3$)[1)] | 0.918 | 0.916 |
| MFI (g/10 mins)[2)] | 0.2 | 1.5 |
| [+)]scatter (%)[3)] | 72 | 40 |
| [+)]strength of a film (g)[4)] | 110 | 72 |

[+)]measured on a 40 μ film
[1)]according to DIN 53,479
[2)]according to DIN 53,735
[3)]determined by means of an apparatus described by E. Schuch in Kunststoffe, 56 (1966), 350 – 354
[4)]Drop Dart Impact Test according to ASTM D 1709-67

EXAMPLE 2

About 1,700 kg/hour of an injection-molding grade of a homopolymer of ethylene are produced in a high pressure tubular reactor and are converted to waxy polyethylene by raising the temperature in the high pressure separator. The conditions in the high pressure separator and low pressure separator, and the product properties achieved, are shown in Table 2. The temperature in the low pressure separator is set to 300° C (Setting II) by using a water-cooled static mixer.

TABLE 2

| Conditions | Setting I | Setting II |
|---|---|---|
| High pressure separator | | |
| Temperature (° C) | 230 | 390 |

TABLE 2-continued

| Conditions | Setting I | Setting II |
|---|---|---|
| mean product residence time (mins) | 10 | 10 |
| pressure (bars) | 300 | 300 |
| Low pressure separator | | |
| Temperature (° C) | 210 | 300 |
| pressure (bars) | 2.5 | 2.0 |
| mean product residence time (mins) | 10 | 10 |
| Product properties | | |
| density (g/cm$^3$)[1] | 0.918 | 0.917 |
| MFI (g/10 mins)[2] | 20 | — |
| melt viscosity at 120° C | — | 900 cSt |
| Shore C hardness[3] | 73 | |
| ball indentation hardness[4] | 16 | |

[1] according to DIN 53,479
[2] according to DIN 53,735
[3] according to DIN 53,505
[4] according to DIN 53,456

EXAMPLE 3

1,300 kg/hour of LDPE having a density of 0.928 g/cm$^3$ [1] and a melt index of 0.4 g/10 mins [2] are produced in a high pressure tubular reactor. The high pressure separator operates under the following conditions: temperature 260° C, pressure 270 bars, mean product residence time 3 mins. Undesirable fluctuations in the melt index, caused by non-constant conditions in the reactor, are counterbalanced by regulating the temperature in the high pressure separator. A rise in the melt index from 0.3 to 0.6 g/10 mins [2] is compensated by lowering the temperature from 290° C to 250° C. To do this, the temperature of the reaction mixture in the high pressure separator is regulated by varying the amount of cooling water fed into the heat exchanger which is located immediately upstream from the high pressure separator. The heat exchange unit between the high pressure separator and low pressure separator was not used. The temperature in the low pressure separator therefore fell from 260° C to 225° C on lowering the temperature in the high pressure separator from 290° C to 250° C. The product residence times in both separators were kept constant. The pressure in the low pressure separator was set to 3.5 bars.

[1] according to DIN 53,479
[2] according to DIN 53,735

We claim:

1. A process for the manufacture of ethylene polymers by homopolymerization of ethylene or copolymerization of ethylene with other monomers which are copolymerizable with ethylene, in a polymerization zone at pressures of from 500 to 5,000 bars and at from 50° to 450° C, followed by isolation of the resulting polymer from the reaction mixture in a two-stage isolation zone at pressures in the first stage of the isolation zone of from 100 to 500 bars and in the second stage of the isolation zone of from 1 to 10 bars and at from 100° to 400° C, with mean product residence times of from 0.5 to 60 minutes in the different stages of the isolation zone, wherein the improvement comprises varying the temperature in the isolation zone to control the molecular weight of the ethylene polymer the temperature being raised to decrease the molecular weight and lowered to increase the molecular weight.

2. A process as set forth in claim 1, wherein the temperature is varied in the first stage and is kept constant in the second stage.

3. A process as set forth in claim 1, wherein the temperature is kept constant in the first stage and is varied in the second stage.

4. A process as set forth in claim 1, wherein the temperature is raised in the first and second stage.

5. A process as set forth in claim 1, wherein the temperature is lowered in the first and in the second stage.

6. A process as set forth in claim 1, wherein the temperature in the isolation zone is varied to compensate for disturbances in the polymerization zone, whereby the molecular weight of the product remains constant.

* * * * *

UNITED STATES PATENT AND TRADEMARK OFFICE
CERTIFICATE OF CORRECTION

PATENT NO. : 4,093,795
DATED      : June 6, 1978
INVENTOR(S) : BUECHNER ET AL

It is certified that error appears in the above–identified patent and that said Letters Patent are hereby corrected as shown below:

In the Heading, after section"[22] Filed: May 19, 1976" insert the following section --[30] Foreign Application Priority Data June 3, 1975   Fed. Rep. of Germany. . 2524474--.

In Claim 4, line 2, insert--in the--after "and".

Signed and Sealed this

Eighth Day of May 1979

[SEAL]

Attest:

RUTH C. MASON
Attesting Officer

DONALD W. BANNER
Commissioner of Patents and Trademarks